Feb. 13, 1973
R. T. CLARK
3,716,376
METHOD AND APPARATUS FOR MAKING CHEESE
Filed Nov. 12, 1969
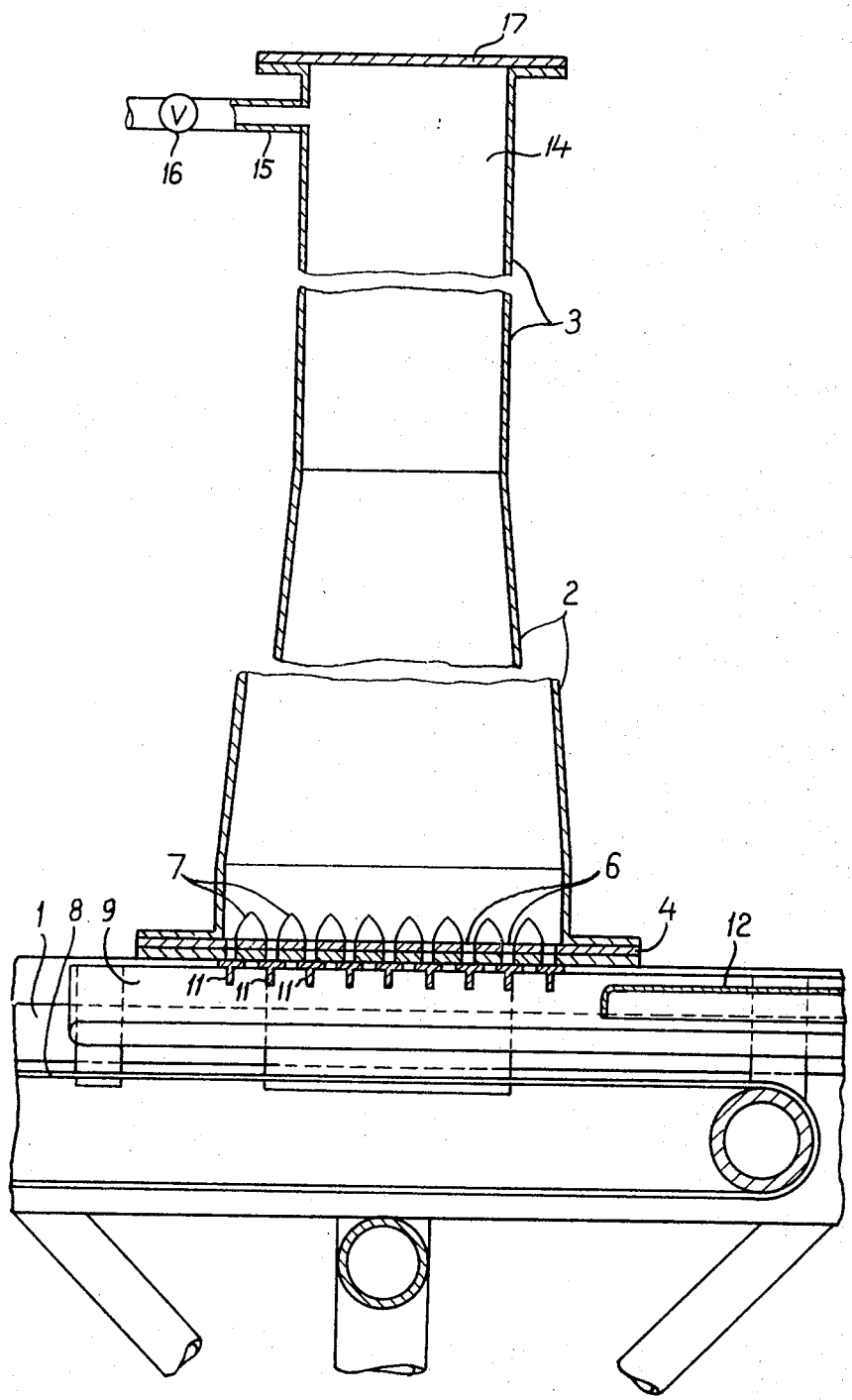
INVENTOR.
REGINALD THOMAS CLARK
BY
Davis, Hoxie, Faithfull & Hapgood
ATTORNEYS

United States Patent Office 3,716,376
Patented Feb. 13, 1973

3,716,376
METHOD AND APPARATUS FOR
MAKING CHEESE
Reginald Thomas Clark, Staines, England, assignor to
Alfa-Laval AB, Tumba, Sweden
Filed Nov. 12, 1969, Ser. No. 875,959
Claims priority, application Great Britain, Nov. 13, 1968,
53,924/68
Int. Cl. A23c 19/00; A01j 25/12
U.S. Cl. 99—115
4 Claims

ABSTRACT OF THE DISCLOSURE

Curds substantially freed from whey are fed into a vertical tower and extruded under pressure through a plurality of apertures in the base of the tower, and the curds are subjected to a lateral spreading action and to a lateral compressive action as they travel downwardly through the tower toward the extrusion apertures. The extruding pressure may be provided by applying pneumatic pressure to a head space in the tower, and the extruded curd may be cut into separate lengths by cutting means located below the tower base.

---

This invention relates to the production of cheese, and in particular to a novel method and apparatus for cheddaring.

Cheddaring is traditionally carried out in vats, in which blocks of curd are cut into blocks and repeatedly turned by hand. The process is arduous and time consuming.

In making cheese according to the present invention, however, curds substantially freed from whey are fed into a vertical tower and extruded under pressure through a plurality of extrusion apertures in the base of the tower, the curds being subjected to a lateral spreading action in their downward travel through the tower.

The invention also provides cheese-making apparatus for carrying out the new method and comprising a vertical tower having a horizontal base with a plurality of extrusion apertures therethrough, and means for applying downward pressure to curds in the tower.

It is believed that the lateral spreading action referred to above contributes significantly to the very good grain structure and "chickenbreast" texture which I have obtained in tests. The lateral spreading can be achieved by the use of a tower which increases in cross-section in a direction from the top to the bottom of the tower. However, I have also had good results with a parallel-sided tower in which the lateral spreading action is obtained by guide means located close to the base of the tower and serving to deflect curds laterally towards the extrusion apertures. In the preferred form of apparatus described below, both of these expedients for obtaining a lateral spreading action are used.

The arrangement of the extrusion apertures in the base of the tower is also believed to benefit the process in that it assists in the complete dispersal of pockets of whey which may be trapped in the passage of curds down through the tower.

The operation may be carried out in batches or on a continuous basis. In batch operation, the tower is filled with curd particles and, after a certain interval, subjected to air pressure applied to a head space at the top of the tower to extrude the curd in strings which are severed into short lengths by a cutting means below the base of the tower. If the process is continuous, the curd is propelled through the column under mechanical pressure exerted, for example, by an archimedian screw or a reciprocating piston. In either case, the pieces of curd leaving the tower may be salted directly and passed to a filling station for hooping and subsequent pressing.

A preferred form of cheese-making apparatus for carrying out the invention is described below, by way of example only, with reference to the accompanying drawing, in which the single illustration is a side elevational view of the appaartus, partly in section and with parts broken away.

The apparatus shown in the drawing comprises a rigid frame 1 on which is securely mounted a hollow tower 2 of frustro-conical section surmounted by a parallel-sided tower section 3. The tower 2 is closed at the bottom by a base 4 perforated by plain, circular extrusion apertures 6, between adjacent rows of which are arranged guide means 7 mounted on the upper surface of the base 4. As shown, each guide means 7 is in the form of a narrow strip of generally triangular cross-section so that it flares downward and outward toward the apertures 6 in the adjacent rows. Also mounted on the frame 1 is a belt conveyor 8 and a carriage 9, the latter supporting a cutter assembly consisting of a number of transverse knives 11. This cutter assembly can be oscillated longitudinally of the apparatus (left to right as seen in the drawing) by a mechanical vibrator (not shown) so that the knives traverse the extrusion apertures in the base of the tower. A pusher plate 12 is reciprocable by a pneumatic cylinder (not shown) to remove any curd adhering to the knives, from whence the severed curd drops onto the conveyor 8.

Means are also provided for applying air pressure to the headspace 14 of the tower. Such means are shown as comprising a compressed air pipe-line 15 opening into the headspace and having a valve 16 by which the supply of compressed air-can be turned on and off.

In use, a mixture of curds and whey is pumped to a curd separating device, such as a vibrating screen or a rotating cylinder. Curds, substantially freed of whey, are then fed into the tower 2–3 through its open top and, after a suitable interval, the tower is closed by a cover plate 17 removably secured to the upper section 3, whereupon the headspace 14 is subjected to air pressure by opening the valve 16. The curds are thus forced downwardly through the tower and in this downward travel are subjected to a lateral spreading action, due to the cross-section of the tower. A further lateral spreading action is provided by the upwardly tapering ends of guides 7 which deflect curds laterally towards the extrusion apertures 6. The curds are extruded through these apertures in the base of the tower; after being compressed laterally as they are forced through the downwardly tapering gaps between adjacent guides 7.

By way of example, the tower may be about 8 feet high overall and the air pressure employed may be in the order of 5 p.s.i.

I claim:

1. In the production of cheese, the method which comprises feeding curds substantially freed from whey into a vertical tower which increases in cross-section from top to bottom of the tower, pressing the curds downward to extrude them under pressure through a plurality of extrusion apertures in the base of the tower, and subjecting the curds in their downward travel in the tower toward said apertures first to a lateral spreading action by means of said increase in cross-section and then to a lateral compressive action by means of horizontally spaced guides tapering upwardly from said tower base to form downwardly tapering gaps opening into said extrusion apertures.

2. The method according to claim 1, in which said extrusion under pressure is effected by applying pneumatic pressure to a headspace in the tower.

3. Apparatus for making cheese, which comprises a vertical tower forming a passage means for downward travel of curds, said passage means being configurated to subject the curds to a lateral spreading action and then to a lateral compressive action in their downward travel, said tower having a horizontal base provided with a plurality of extrusion apertures therethrough, and means for applying downward pressure to curds in the tower to extrude curds through said apertures, said tower having a cross-section which increases in the direction from the upper end to the lower end of the tower, to provide said spreading action, said passage means being partly defined by horizontally spaced guides tapering upwardly from said tower base, said guides forming downwardly tapering gaps opening into the extrusion apertures and which subject the curds to said lateral compressive action.

4. Apparatus according to claim 3, comprising also cutting means located below said tower base for cutting extruded curd into separate lengths.

References Cited

UNITED STATES PATENTS

| | | | |
|---|---|---|---|
| 2,272,954 | 2/1942 | Sartori | 31—46 |
| 2,982,655 | 5/1961 | Budd et al. | 99—116 |
| 3,541,686 | 11/1970 | Koopmans | 99—243 X |
| 3,404,009 | 10/1968 | Lambert et al. | 99—116 |
| 3,468,354 | 9/1969 | Reachert | 146—151 X |
| 3,506,046 | 4/1970 | Webb | 146—151 X |

A. LOUIS MONACELL, Primary Examiner

D. M. NAFF, Assistant Examiner

U.S. Cl. X.R.

31—46, 89; 99—243